A. A. ARNOLD.
PROCESS OF MANUFACTURING SPECTACLE TEMPLES.
APPLICATION FILED SEPT. 13, 1917.
1,248,593.
Patented Dec. 4, 1917.
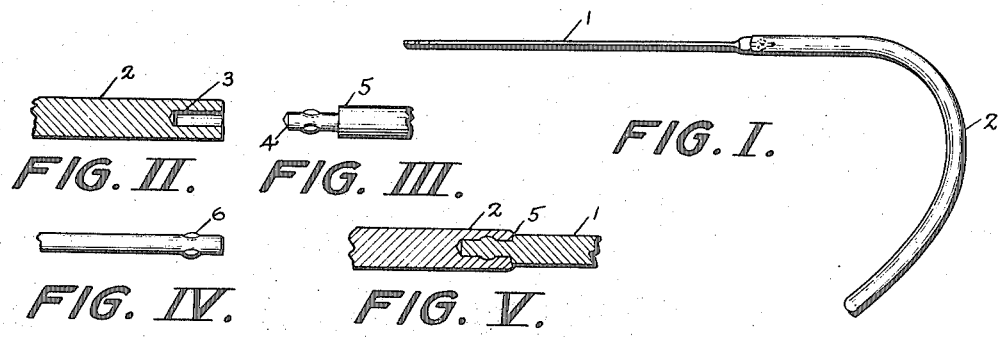
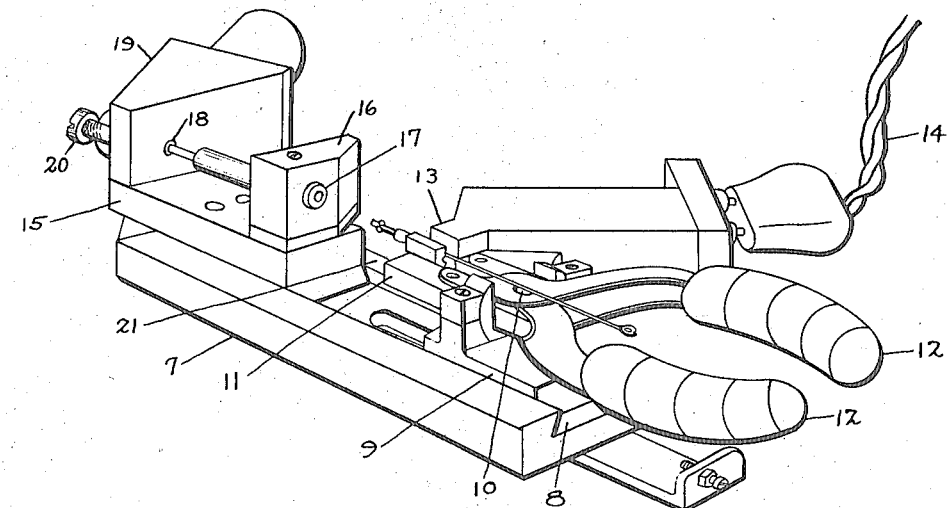
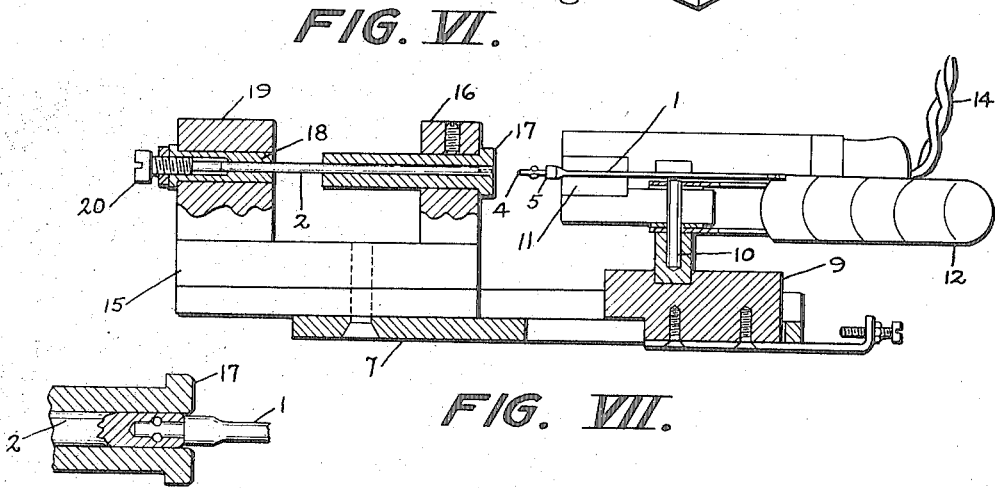
INVENTOR
ARTHUR A. ARNOLD
BY
H. H. Styll, A. H. Parsons
ATTORNEYS

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS OF MANUFACTURING SPECTACLE-TEMPLES.

1,248,593.  Specification of Letters Patent.  Patented Dec. 4, 1917.

Application filed September 13, 1917. Serial No. 191,188.

*To all whom it may concern:*

Be it known that I, ARTHUR A. ARNOLD, a citizen of the United States, residing at Southbridge, in the county of Worcester and State of Massachusetts, have invented certain new and useful Improvements in Processes of Manufacturing Spectacle-Temples, of which the following is a specification.

This invention relates to improvements in spectacle temples or similar parts for ophthalmic mountings and has particular reference to such parts formed from a combination of metallic and non-metallic materials.

One of the leading objects of the present invention is the provision of an improved process of forming a construction of this character to insure ready firm and accurate connection of the two parts of the mounting.

A further object of the invention is the provision of an improved process which will enable the parts to be satisfactorily united without the necessity for previously softening the non-metallic member for insertion of the metallic member therein.

Other objects and advantages of my improved structure and process of forming the same should be readily apparent by reference to the following specification taken in connection with the accompanying drawings forming a part thereof, and it will be understood that I may make any modifications in the structure of the several parts or in the steps of the hereinafter described process within the scope of the appended claims without departing from or exceeding the spirit of my invention.

Figure I represents a view in elevation of a complete temple constructed in accordance with my improved process.

Fig. II represents a sectional view of one of the parts on which a preliminary operation has been performed.

Fig. III represents a view of the part for coöperation therewith.

Fig. IV represents a view of a slightly modified construction similar to that shown in Fig. III and capable of substitution for the parts shown in Fig. III for use in connection with Fig. II.

Fig. V represents a sectional view of the joint between the parts when completed.

Fig. VI represents a perspective view of one form of apparatus for carrying my process into effect.

Fig. VII represents a longitudinal sectional view of the apparatus.

Fig. VIII represents an enlarged detail view of the specific means here employed for retaining the parts of the joint in position.

In the drawings, the numeral 1 designates the metallic side for a temple having united therewith as shown in Fig. I a non-metallic ear hook portion 2.

I realize that prior to my invention certain attempts have been made to unite these parts in various manners, including the softening of the temple section by heat or the like, the forcing together of the two parts without the use of heat, but so far as I am aware no one prior to my invention of the present improved process has united the parts in the particular manner and in accordance with the process hereinafter described and claimed.

In the carrying out, therefore, of my novel and improved process I preferably form in the ear hook or non-metallic section 2 the socket 3 adapted to receive the tang 4 on the side 1, this tang being preferably formed with the enlargement 5 to more nearly correspond with the diameter of the non-metallic portion 2 and thus present a more neat and attractive appearance, though this enlargement may be dispensed with as in the form illustrated in Fig. IV, if desired, my improved process and apparatus for carrying out the process being equally applicable to either form of construction.

In both Figs. III and IV, I have shown the tang 4 as provided with the laterally displaced portions or wings 6 which project therefrom and are adapted to bite into the material of the portion 2 to prevent either relative longitudinal or relative twisting movement of the parts 1 and 2.

In the process of uniting the parts just described it is desirable to force the tang and wings longitudinally into the part 2 in such manner that they will become anchored in position without the use of supplemental or additional fastening devices.

Various means, as above mentioned, may be attempted for accomplishing this result, but I have found by actual use that the following process will produce the most satisfactory results. This process consists essentially in the rigid holding of the portion 2 to prevent any distortion or lateral expansion thereof, and while so held forcing endwise thereinto the metallic member, said metallic member, however, being heated to a sufficient temperature to cause the non-metallic portion 2 to yield or flow but not to a sufficient temperature to either melt or char the part 2 or discolor the part 1. Preferably in the carrying out of my process I form the socket 3 previously described, although it will be understood that if preferred to use additional force and heat in assembling the parts the additional socket 3 may be dispensed with and the tang pressed direct onto the member 2.

In Figs. VI and VII, I have particularly illustrated a form of apparatus adapted for use in the carrying out of my process, although it will be understood that other forms of apparatus may be employed or the process itself entirely manually carried out and various heating arrangements and the like for the temple side 1 employed without in any way departing from my invention.

In the drawings of the apparatus, the numeral 7 designates a suitable base or bed having formed therein the guide-way 8, in which is slidably supported the tool block 9 bearing the swivel 10 having rotatably mounted therein the pair of pliers having the parallel moving jaws 11 and insulated handles 12, one of the jaws 11 bearing the suitably heated block 13 shown in the present instance as provided with the connection 14 leading to a suitable source of electrical current for heating of the block, although it will be understood that gas or other heat may be substituted if preferred. The block 13 and jaw on which it is mounted are thus heated to desired degree of temperature and serve through conduction to heat the portion of the temple side 1 held therebetween and thus the tang 4 and wing 6.

Also mounted upon the bed plate 7, preferably suitably secured within the guide way 8, is the holder for the ear hook 2. This holder comprises a base portion 15 having rising therefrom the standard 16 bearing the bushing 17 of size to just receive and have sliding fit with the zylonite tip or ear hook 2 which projects rearwardly therefrom into the second bushing 18 carried by the bracket 19 and having extending thereinto the stop screw 20 which may be adjusted according to the length of the tip 2 mounted within the bushings to always insure the socketed end thereof being in correct position for engagement with the tip of the side 1 and making the apparatus applicable for use with various lengths of sides or ear hook portions.

In the carrying out of my process I preferably form the tip 2 with the socket 3 as illustrated in Fig. II and insert it within the bushings 17 and 18. I then place the side 1 between the jaws 11 while said jaws are heated, the heat of the jaws serving to raise the temperature of the side held therebetween to the proper point. The slide 9 is then shifted along in the guide to bring the tip of the tang 4 into engagement with the outer end of the socket 3 and forcibly pressed inward to force the tang into the socket, the socket if present being preferably slightly smaller than the diameter of the tang. As this operation is performed the heat of the tang will cause the material of the tip to be softened and allow the tang to pass thereinto, the bushing holding the tip against expansion or distortion so that any flow of displaced material will be outwardly toward the enlargement 5 on the side, the inward pressure being continued until the enlargement 5 is pressed tightly against the outwardly flowing material at the end of the side 2, or in the absence of the enlargement 5, until the stop 21 on the jaw 11 contacts with the bracket 16 to limit the relative movement of the parts.

If desired to increase the security of the joint between the parts a twisting movement may be imparted to the side 1 during the formation of the joint, the pliers turning in their swivel support 10 previously referred to.

It is to be noted that in Fig. VII, I have shown a slightly different form of stop, in that the stop in this instance in place of being placed on one of the plier jaws adjacent the joint is secured to the sliding block 9 and adapted to contact with the base 7, the result accomplished, however, being the same in both instances.

The parts having been thus united the jaws of the pliers are opened and the entire temple withdrawn from the pliers and from the bushings 17 and 18 and plunged into a suitable chilling bath to cause a sudden hardening and setting of the stock forming the member 2 in tight engagement with the side 1 and preventing any possible loosening as might occur were a gradual and consequent shrinkage permitted.

From the foregoing description taken in connection with the accompanying drawings, the essential steps in the carrying out of my improved process should be readily understood, and it will be seen that they consist primarily in the suitable preparation of the two parts to be united, in the holding of the non-metallic part against either expansion or longitudinal shifting and in the heating or forcing while hot into the non-metallic part of the metallic part and in the subsequent sudden chilling of the parts to cause them to stay in tight engagement one with the other.

I claim:

1. The process of forming a fitting for an ophthalmic mounting, consisting in preparing a metallic part and a non-metallic part, holding the non-metallic part against expansion at the joint and against longitudinal shifting movement, heating the metallic part and forcing the metallic part while hot into the non-metallic part.

2. The process of forming a fitting for an ophthalmic mounting, consisting in preparing a metallic part and a non-metallic part, holding the non-metallic part against expansion at the joint and against longitudinal shifting movement, heating the metallic part and forcing the metallic part while hot into the non-metallic part, discontinuing the heating and suddenly chilling the joint to set the parts.

3. The process of forming a fitting for an ophthalmic mounting, consisting in forming a non-metallic member with a socket, forming a metallic member with a tang having portions of greater diameter than the socket, heating the metallic member and forcing the heated member into the socket while the non-metallic member is held against expansion whereby longitudinal displacement only of the stock of the non-metallic member occurs during the uniting operation.

4. The process of forming a combination metallic and non-metallic temple for a spectacle, consisting in surrounding the joint of the non-metallic member with a holder to prevent expansion thereof, heating a metallic member and forcing the metallic member into the non-metallic member whereby the heat will soften the non-metallic member to allow the entrance of the metallic member thereinto and the holder will prevent lateral displacement and cause longitudinal flow only of the softened non-metallic member mounted therein.

5. The process of uniting a metallic with a non-metallic fitting for an ophthalmic mounting, consisting in securing the non-metallic member against longitudinal movement, heating the metallic member and forcing the metallic member against the non-metallic member with a twisting movement whereby the metallic member may be readily embedded in the non-metallic member.

6. The process of uniting a metallic part with a non-metallic part of an ophthalmic mounting, consisting in clampingly securing both of said parts, holding the non-metallic part against lateral expansion, forming laterally extending wings on the metallic part, bringing the parts into engagement one with the other, heating the metallic part, and forcing the metallic part into the non-metallic part by the relative spiral movement of the parts, whereby the wings on the metallic part will become firmly embedded in the non-metallic part and the longitudinal flow of the non-metallic material as softened by the heat of the metallic member will fill in the groove behind the entering wings and prevent withdrawal thereof.

7. The process of uniting a non-metallic temple tip with a metallic side, consisting in forming the tip with a socket, forming the side with a tang and wings of greater diameter than that of the socket, heating the tang and wings, holding the tip around the socket against lateral displacement and forcing the tang and wings into the socket while so held, whereby the heat of the parts will soften the wall of the socket and the securing of the socket against displacement will cause the softened material to have a longitudinal flow only, closing up the grooves formed by insertion of the wings to firmly lock the parts together.

8. The process of uniting a non-metallic temple tip with a metallic side, consisting in forming the tip with a socket, forming the side with a tang and wings of greater diameter than that of the socket, heating the tang and wings, holding the tip around the socket against lateral displacement and forcing the tang and wings into the socket while so held, whereby the heat of the parts will soften the wall of the socket and the securing of the socket against displacement will cause the softened material to have a longitudinal flow only, closing up the grooves formed by insertion of the wings to firmly lock the parts together, and suddenly chilling the joint thus formed to set the parts.

In testimony whereof I have affixed my signature, in presence of two witnesses.

ARTHUR A. ARNOLD.

Witnesses:
  E. M. HALVORSEN,
  E. M. LAFLER.